US008559194B2

United States Patent
Coccia et al.

(10) Patent No.: US 8,559,194 B2
(45) Date of Patent: Oct. 15, 2013

(54) CONVERTER CIRCUIT AND UNIT AND SYSTEM COMPRISING SUCH CONVERTER CIRCUIT

(75) Inventors: Antonio Coccia, Baden (CH); Francisco Canales, Baden-Dättwil (CH); Manfred Winkelnkemper, Ennetbaden (CH); Marc Pellerin, Morges (CH); Nicolas Hugo, Genève (CH); Philippe Stefanutti, Choisy (FR); Toufann Chaudhuri, Morges (CH)

(73) Assignee: ABB Research Ltd., Zurich (CH)

( * ) Notice: Subject to any disclaimer, the term of this patent is extended or adjusted under 35 U.S.C. 154(b) by 125 days.

(21) Appl. No.: 13/094,227

(22) Filed: Apr. 26, 2011

(65) Prior Publication Data

US 2011/0222317 A1 Sep. 15, 2011

Related U.S. Application Data

(63) Continuation of application No. PCT/EP2009/063113, filed on Oct. 8, 2009.

(30) Foreign Application Priority Data

Oct. 27, 2008 (EP) .................................... 08167670

(51) Int. Cl.
*H02M 3/335* (2006.01)

(52) U.S. Cl.
USPC .......................... 363/21.02; 323/222

(58) Field of Classification Search
USPC .......... 363/16, 17, 21.02–21.18, 65; 323/222, 323/282, 290
See application file for complete search history.

(56) References Cited

U.S. PATENT DOCUMENTS 5,245,520 A * 9/1993 Imbertson .................. 363/17
5,438,497 A * 8/1995 Jain ............................ 363/17
(Continued)

FOREIGN PATENT DOCUMENTS

DE 19827872 A1 12/1999
DE 10204219 A1 8/2003
(Continued)

OTHER PUBLICATIONS

Notification of Transmittal of Translation of the International Preliminary Report on Patentability, Notification Concerning Transmittal of International Preliminary Report on Patentability, International Preliminary Report on Patentability (Forms PCT/IB/338, PCT/IB/326 and PCT/IB/373) and the Written Opinion of the International Searching Authority (Form PCT/ISA/237) issued in the corresponding International Application No. PCT/EP2009/063113 dated May 12, 2011.
International Search Report (PCT/ISA/210) issued on Jan. 13, 2010, by European Patent Office as the International Searching Authority for International Application No. PCT/EP2009/063113.
European Search Report dated Feb. 4, 2009 for European Application No. 08167670.2.

*Primary Examiner* — Rajnikant Patel
(74) *Attorney, Agent, or Firm* — Buchanan Ingersoll & Rooney PC

(57) ABSTRACT

A converter circuit has a first resonant converter that is connected on the DC voltage side to a first energy storage circuit, and a transformer. A second resonant converter is connected on the AC voltage side to the secondary winding of the transformer and on the DC voltage side to a load converter, and a CLL resonant circuit is connected to the first resonant converter and to the primary winding of the transformer. The CLL resonant circuit has a resonant capacitance, a first resonant inductance and a second resonant inductance.

12 Claims, 6 Drawing Sheets

(56) References Cited

U.S. PATENT DOCUMENTS

| | | | |
|---|---|---|---|
| 5,808,879 A * | 9/1998 | Liu et al. | 363/17 |
| 5,946,206 A * | 8/1999 | Shimizu et al. | 363/65 |
| 6,344,979 B1 * | 2/2002 | Huang et al. | 363/16 |
| 6,349,044 B1 * | 2/2002 | Canales-Abarca et al. | 363/17 |
| 7,548,435 B2 * | 6/2009 | Mao | 363/16 |
| 7,554,824 B2 | 6/2009 | Stefanutti et al. | |
| 7,746,041 B2 * | 6/2010 | Xu et al. | 323/223 |
| 2008/0190906 A1 | 8/2008 | Aigner | |

FOREIGN PATENT DOCUMENTS

| | | |
|---|---|---|
| DE | 102005036806 A1 | 2/2007 |
| EP | 1750361 A1 | 2/2007 |
| FR | 2780215 | 12/1999 |

* cited by examiner

… (1) …

CONVERTER CIRCUIT AND UNIT AND SYSTEM COMPRISING SUCH CONVERTER CIRCUIT

RELATED APPLICATION

This application claims priority as a continuation application under 35 U.S.C. §120 to PCT/EP2009/063113, which was filed as an International Application on Oct. 8, 2009 designating the U.S., and which claims priority to European Application 08167620.2 filed in Europe on Oct. 27, 2008. The entire contents of these applications are hereby incorporated by reference in their entireties.

FIELD

The disclosure relates to power electronics, such as, a converter unit, and a system having a converter circuit.

BACKGROUND INFORMATION

For many applications, for example, in industrial and in traction applications, such as in the railroad field, energy is exchanged between connected loads and generators by means of AC voltage and alternating current, and DC voltage and direct current. In many applications, a different fixed frequency or variable frequency is specified. For example, not only is energy passed from the energy generator to the load, but also in the opposite direction, and converter circuits can be used for this purpose.

A converter circuit for conversion of an AC voltage to a second AC voltage is specified, for example, in DE 198 27 872. In this document, the converter circuit comprises an input-side rectifier and a capacitive energy storage circuit and inverter, which are connected downstream from the rectifier on the output side. On the output side, the inverter is connected to the primary side of a transformer. A capacitance is in each case connected in series with the primary and secondary windings of the transformer. Furthermore, the secondary side of the transformer is connected to a further inverter, with a further capacitive energy storage circuit connected downstream therefrom. The converter is controlled such that an appropriate AC voltage is produced by clocking the DC voltage at the input-side inverter, by means of the capacitive energy store, the capacitances connected in series with the transformer and the stray inductance of the transformer, on the output side to the capacitive energy store.

In the converter circuit mentioned above, despite the existing resonant circuit, switching losses can nevertheless still occur in the power semiconductor switches in the converter, thermally loading these power semiconductor switches heavily. In consequence, the power semiconductor switches age correspondingly quickly, and the failure rates of the power semiconductor switches rise with the operating life of the converter circuit. High availability of the converter circuit, as can be specified for traction applications, is then no longer ensured.

By way of example, further converter circuits are known from U.S. Pat. No. 6,344,979, which discloses a DC-DC converter circuit having an LLC intermediate resonant circuit connected to the primary winding of the transformer. The resonant capacitance therein is connected in series to the first resonant inductance, and the first resonant inductance is connected to a first end of the primary winding of the transformer. The second resonant inductance is connected in parallel with the primary winding of the transformer, that is to say it is connected on the one hand to the first end of the primary winding and the first resonant capacitance, and on the other hand to the second end of the primary winding of the transformer.

DE 10 2005 036 806 discloses a circuit for a welding current source having resonant converters which are arranged in parallel and are connected to a load circuit via a respective transformer. The secondary sides of the transformers are connected in series. The individual resonant circuits are formed by a capacitance and an inductance in series with the primary side of the transformer, and a capacitance in parallel with the secondary side of the transformer.

DE 102 04 219 discloses a converter system having a plurality of partial converter systems for feeding a load. Each partial converter system has a transformer which is connected on the input side directly to a medium-frequency DC voltage inverter.

SUMMARY

A converter circuit comprising a first resonant converter that is connected on a DC voltage side to a first energy storage circuit. A transformer and a second resonant converter is connected on an AC voltage side to a secondary winding of the transformer and on the DC voltage side to a load converter. A CLL resonant circuit is connected to the first resonant converter and to a primary winding of the transformer and has a resonant capacitance, a first resonant inductance, and a second resonant inductance. The resonant capacitance is connected in series with the first resonant inductance, which is connected to a first connection point of the primary winding of the transformer and the resonant capacitance is connected to the first resonant converter, and the second resonant inductance is connected to the connection point of the resonant capacitance to the first resonant inductance, the second resonant inductance is connected to a second connection point of the primary winding of the transformer, and the second connection point of the primary winding of the transformer is connected to the first resonant converter.

BRIEF DESCRIPTION OF THE DRAWINGS

These and further objects, advantages and features of the present disclosure will become clear from the following detailed description of exemplary embodiments of the invention, in conjunction with the drawings as follows.

DETAILED DESCRIPTION

Figure 1:
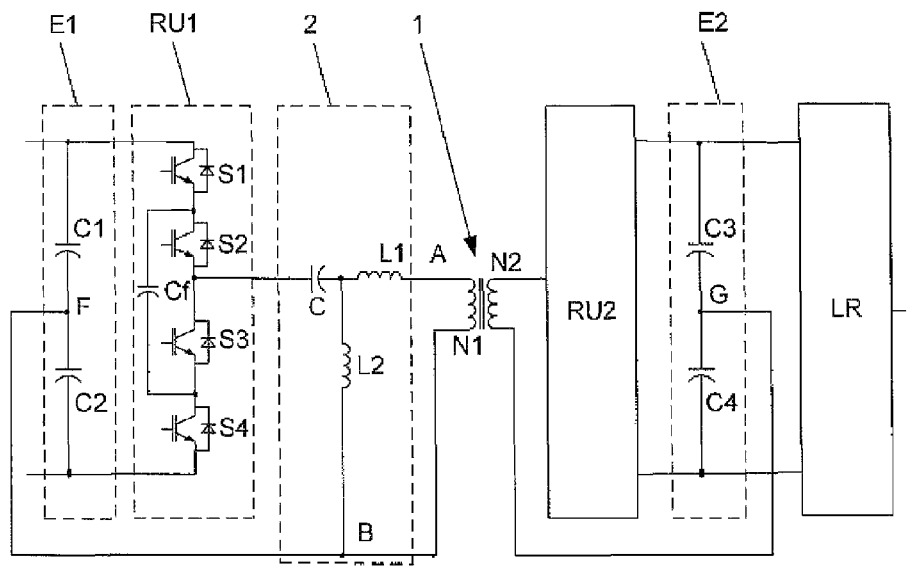
FIG. 1 shows a converter circuit in accordance with a first exemplary embodiment.

One object of the disclosure is therefore to specify an improved converter circuit, which has low switching losses and allows softer switching. A further object is to specify a unit having converter circuits and a system having converter circuits, which can be easily implemented.

The converter circuit comprises a first energy storage circuit, a resonant converter, a transformer, a second resonant converter, a second energy storage circuit and a load converter. The second resonant converter is connected on the input side to the secondary winding of the transformer, and a CLL resonant circuit, which is connected to the first resonant converter and to the primary winding of the transformer, which CLL resonant circuit has a resonant capacitance, a first resonant inductance and a second resonant inductance. The resonant capacitance can be connected in series with the first resonant inductance, and the first resonant inductance can be connected to a first connection point of the primary winding of the transformer. Furthermore, the resonant capacitance can be connected to the first resonant converter, the second resonant inductance can be connected to the connection point of the resonant capacitance to the first resonant inductance, and the second resonant inductance can be connected to a second connection point of the primary winding of the transformer. The second connection point of the primary winding of the transformer can be connected to a connection point of the first energy storage circuit. The CLL resonant circuit can be in the form of a "T" circuit.

Furthermore, the controllable bidirectional power semiconductor switches in the first resonant converter can also be switched on and off without voltage by means of the CLL resonant circuit. The CLL resonant circuit can be controlled by the first resonant converter such that it oscillates at its resonant frequency, in addition to the controllable bidirectional power semiconductor switches which can be used, for example, in the first resonant converter and can be switched on and off without current flowing. This makes it possible to further reduce the switching losses in the controllable bidirectional power semiconductor switches in the first resonant converter, which can allow low-loss conversion of a first DC voltage to a second DC voltage. The first DC voltage can be applied to the input of the first energy storage circuit and the second DC voltage can be produced at the output of the second energy storage circuit. The reduction in the switching losses lengthens the life of the controllable bidirectional power semiconductor switches correspondingly, allowing the failure rates of the converter circuit to be kept low, thus resulting in high converter circuit availability.

The converter circuit and the converter unit according to the present disclosure have at least two converter circuits that can be connected in parallel or in series on the input side, or can be connected in series or in parallel with one another. The system can be of reasonably simple design, with the input-side parallel connection of the first energy storage circuits can allow a high input direct current, which can enable more electrical energy to be transferred. The input-side series circuit of the first energy storage circuits in turn allows a high input DC voltage, and therefore likewise large amounts of electrical energy to be transferred.

The reference symbols used in the drawing, and their meanings are listed in summary form in the list of reference symbols. In principle, the same parts are provided with the same reference symbols in the figures. The described embodiments represent examples of the subject matter according to the invention, and have no descriptive effect.

The description of the illustrated embodiments in each case relates to a load flow direction which runs from the primary side N1 of the transformer 1 to its secondary side N2. FIG. 1 shows a converter circuit in accordance with a first exemplary embodiment. The converter circuit therein comprises a first resonant converter RU1, which can be connected on the input side to an upstream first energy storage circuit E1 and on the output side to a CLL resonant circuit 2 and to the primary winding N1 of the transformer 1. The secondary winding N2 of the transformer 1 can be connected to the input side of the second resonant converter RU1. The second energy storage circuit E2 can be connected on the input side to the output side of the second resonant converter RU1, and on the output side to the load converter LR. The first energy storage circuit E1 can be formed from two series-connected capacitances C1 and C2, whose common connection point F can be connected to the primary winding N1 of the transformer 1. The second energy storage circuit E2 can be likewise formed from two series-connected capacitances C3 and C4, whose common connection point G can be connected to the secondary winding N2 of the transformer 1.

As shown in the embodiment in FIG. 1, the first resonant converter RU1 can be in the form of a three-level converter in a half-bridge configuration, or else in a simple half-bridge configuration, a simple full-bridge configuration, a three-level full-bridge configuration, or other suitable circuit configuration as desired. The second resonant converter RU2 can be designed in a manner corresponding to the first resonant converter RU1. Although this is not explicitly illustrated in the embodiment in FIG. 1, the load converter LR can be in any feasible form known by a person skilled in the art. The CLL resonant circuit 2 can be connected to the first resonant converter RU1 and to the primary winding N1 of the transformer 1, with the CLL resonant circuit 2 having a resonant capacitance C, a first resonant inductance L1 and a second resonant inductance L2.

According to exemplary embodiments of the present disclosure, the resonant capacitance C can be connected in series with the first resonant inductance L1, the first resonant inductance L1 can be connected to a first connection point A of the primary winding N1 of the transformer 1, and the resonant capacitance C can be connected to the output side of the resonant converter 1. The second resonant inductance L2 can be connected with the connection point of the resonant capacitance C to the first resonant inductance L1, with the second resonant inductance L2 being connected to the second connection point B of the primary winding N1 of the transformer 1. The second connection point B of the primary winding N1 of the transformer 1 can be connected to the connection point F of the capacitive energy storage circuit E1. The CLL resonant circuit 2 can be controlled, for example, by the first resonant converter RU1 such that the CLL resonant circuit 2 oscillates at its resonant frequency. As a result, it is also possible to switch the controllable bidirectional power semiconductor switches in the first resonant converter RU1 on and off without voltage, in addition to the controllable bidirectional power semiconductor switches which can be used in the first resonant converter RU1 being switched on and off without any current flowing.

The switching losses in the controllable bidirectional power semiconductor switches in the first resonant converter RU1 can thus be reduced further, and can allow low-loss conversion of the first DC voltage to a second DC voltage. The first DC voltage can be applied to the input of the first energy storage circuit E1 and the second DC voltage can be produced at the output of the second energy storage circuit E2. The reduction in the switching losses lengthens the life of the controllable bidirectional semiconductor switches in a corresponding manner, and the failure rates of the converter circuit can be kept low, which can result in high converter circuit availability. In an exemplary embodiment, the controllable bidirectional power semiconductor switches in the first resonant converter RU1 can be switched during operation at a switching frequency that corresponds to the resonant frequency of the CLL resonant circuit 2, because the switching losses that occur are low when the controllable bidirectional power semiconductor switches are switched on and off without any current flowing and the controllable bidirectional power semiconductor switches are switched on and off without voltage. If the switching frequency of the controllable bidirectional power semiconductor switches is higher than the resonant frequency, then the oscillations that are generated by the switching processes in the controllable bidirectional power semiconductor switches can be kept low to the desired extent both on the input side of the converter circuit, at the input of the first energy storage circuit E1, and on the output side of the converter circuit, at the output of the second energy storage circuit E2, with the switching losses in the controllable bidirectional power semiconductor switches in this case being low, as before.

As shown in FIG. 1, the first resonant converter RU1 can be formed with the first energy storage unit E1 in the configuration of a half-bridge, in which the resonant converter RU1 has a first, a second, a third and a fourth controllable bidirectional power semiconductor switch S1, S2, S3, S4, with the controllable bidirectional power semiconductor switches S1, S2, S3, S4 can be connected in series. A capacitance Cf in the first resonant converter RU1 can be connected in parallel with the two power semiconductor switches S2 and S3, and is therefore connected to the connection point which is formed on the one hand by the power semiconductor switches S1 and S2 and which is formed on the other hand by the power semiconductor switches S3 and S4. The capacitance Cf can stabilize the voltage at the controllable bidirectional power semiconductor switches S1, S2, S3, S4, which voltage corresponds in particular to half the voltage which is present across the first and the second capacitive energy stores C1, C2. The capacitance C1 of the first capacitive energy store E1 can be connected to the first controllable bidirectional power semiconductor switch S1, and the second capacitance C2 in the first capacitive energy store E1 can be connected to the fourth controllable bidirectional power semiconductor switch S4.

According to an exemplary method of the present disclosure, in the converter circuit shown in FIG. 1, the first, second, third, fourth controllable bidirectional power semiconductor switches S1, S2, S3, S4 are each controlled by a control signal, with the control signal being produced in the form of pulse-width modulation. The switching frequency of the controllable bidirectional power semiconductor switches S1, S2, S3, S4 can be determined by the control signal. The control signal for the first controllable bidirectional power semiconductor switch S1 can be in phase with the carrier signal of the pulse-width modulation. In contrast, the control signal for the second controllable bidirectional power semiconductor switch S2 can be in antiphase with the carrier signal of the pulse-width modulation. The drive level of the control signal of the first controllable bidirectional power semiconductor switch S1 and the drive level of the control signal for the second controllable bidirectional power semiconductor switch S2 can be chosen to be in the order of magnitude of 25%, for example, or more preferably an order of magnitude of 75%. The complementary control signal for the second controllable bidirectional power semiconductor switch S2 then can be chosen as the control signal for the third controllable bidirectional power semiconductor switch S3, and the complementary control signal for the second controllable bidirectional power semiconductor switch S3 can be chosen as the control signal for the fourth controllable bidirectional power semiconductor switch S2.

Figure 2:
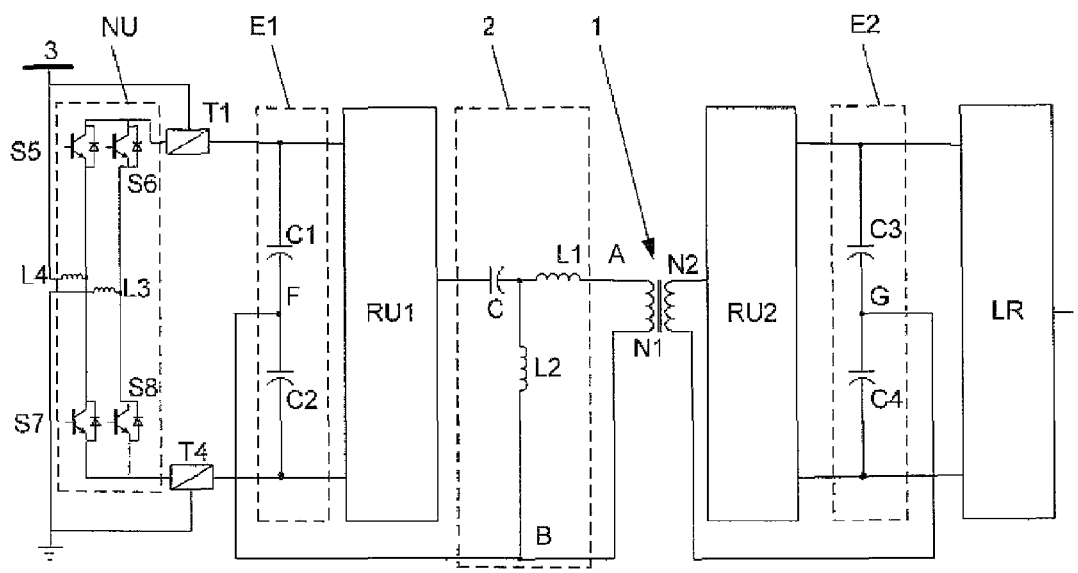
FIG. 2 shows a converter circuit in accordance with a second exemplary embodiment.

FIG. 2 shows a converter circuit in accordance with a second exemplary embodiment. As shown in FIG. 2, the difference that the first energy storage signal E1 can be connected on the input side to a mains converter NU. The main converter can be in the form of a simple full-bridge configuration, or in any other suitable configuration as desired. The illustrated mains converter NU has a fifth, a sixth, a seventh or an eighth controllable bidirectional power semiconductor switch S5, S6, S7, S8, with the respective controllable bidirectional power semiconductor switches S5 and S7 being connected to one another, and the respective controllable bidirectional power semiconductor switches S6 and S8 being connected in series with one another. The two pairs of power semiconductor switches S6, S8 and S5, S7 which are connected in series with one another can be in turn connected in parallel with one another. This results in a common connection point between the power semiconductor switches S5 and S7 and a common connection point between the power semiconductor switches S7 and S8. The connection point of the power semiconductor switches S6 and S8 can be connected via an inductance L3 on the input side to a connection point formed from ground potential and a switch T4. The connection point of the power semiconductor switches S7 and S8 can be connected on the output side via the switch T4 to the input side of the first energy storage circuit E1. Furthermore, the connection point of the power semiconductor switches S5 and S7 can be connected via an inductance L4 on the input side to a connection point formed from the electrical power supply system (3) and the switch T1. The connection point of the power semiconductor switches S5 and S6 can be connected on the output side via the switch T1 to the first capacitance C1 on the input side of the first energy storage circuit E1. The mains converter NU in the converter circuit can be connected or disconnected by means of the switches T1 and T4.

According to the method, in the converter circuit shown in FIG. 2, the first, second, third, fourth controllable bidirectional power semiconductor switches S1, S2, S3, S4 can each be controlled by means of a control signal, with the control signal being produced in the form of pulse-width modulation. The control signal for the first controllable bidirectional power semiconductor switch S1 can be in phase with the carrier signal of the pulse-width modulation. In contrast, the control signal for the fourth controllable bidirectional power semiconductor switch S4 can be in antiphase with the carrier signal of the pulse-width modulation. The drive level of the control signal of the first controllable bidirectional power semiconductor switch S1 and the drive level of the control signal for the fourth controllable bidirectional power semiconductor switch S4 can be chosen to be in the order of magnitude of preferably 25%, for example, or more preferably an order of magnitude of 75%. The complementary control signal for the second controllable bidirectional power semiconductor switch S1 can then be chosen as the control signal for the second controllable bidirectional power semiconductor switch S2, and the complementary control signal for the fourth controllable bidirectional power semiconductor switch S4 can be chosen as the control signal for the third controllable bidirectional power semiconductor switch S3.

In an exemplary embodiment the second resonant inductance L2 can be integrated in the transformer 1. However, in another exemplary embodiment the first resonant inductance L1 can be integrated either additionally or solely in the transformer 1. These measures can allow space to be saved, and simplify the manufacture of the converter circuit, in particular assembly.

In an exemplary embodiment, the first, second, third and fourth controllable bidirectional power semiconductor switches S1, S2, S3, S4 are each in the form of an integrated thyristor commutated via the gate electrode (IGCT—Integrated Gate-Commutated Thyristor), with an associated parallel-connected diode. A thyristor such as this can have low real-power losses while being very robust at the same time, at high voltages in one example and in the event of overvoltages in another example. However, it can be feasible for the first, second, third and fourth controllable bidirectional power semiconductor switches S1, S2, S3, S4 each to be in the form of a bipolar transistor with a gate electrode arranged in an insulated form (IGBT—Insulated Gate Bipolar Transistor) with an associated parallel-connected diode. This exemplary transistor can be distinguished by a high switching frequency, and therefore by low oscillations in the current and in the voltage.

The converter unit according to an exemplary embodiment of the present disclosure in general has at least two of the abovementioned converter circuits, with the first energy stores E1 in each converter circuits being connected in parallel or in series with one another on the input side. The unit can be of reasonably simple design, which can allow a large input direct current because of the first energy stores E1 being connected in parallel on the input side, thus allowing more electrical energy to be transmitted. The input-side series circuit of the first energy stores E1 in turn allows a high input DC voltage, and therefore likewise allows a large amount of electric energy to be transmitted. Furthermore, it can be possible to connect two or more converter units, which have the parallel circuit of first energy stores E1 on the input side, in series with one another. This application of series and parallel circuits can allow for transmission of the high input direct current while allowing high input DC voltages.

Figure 3:
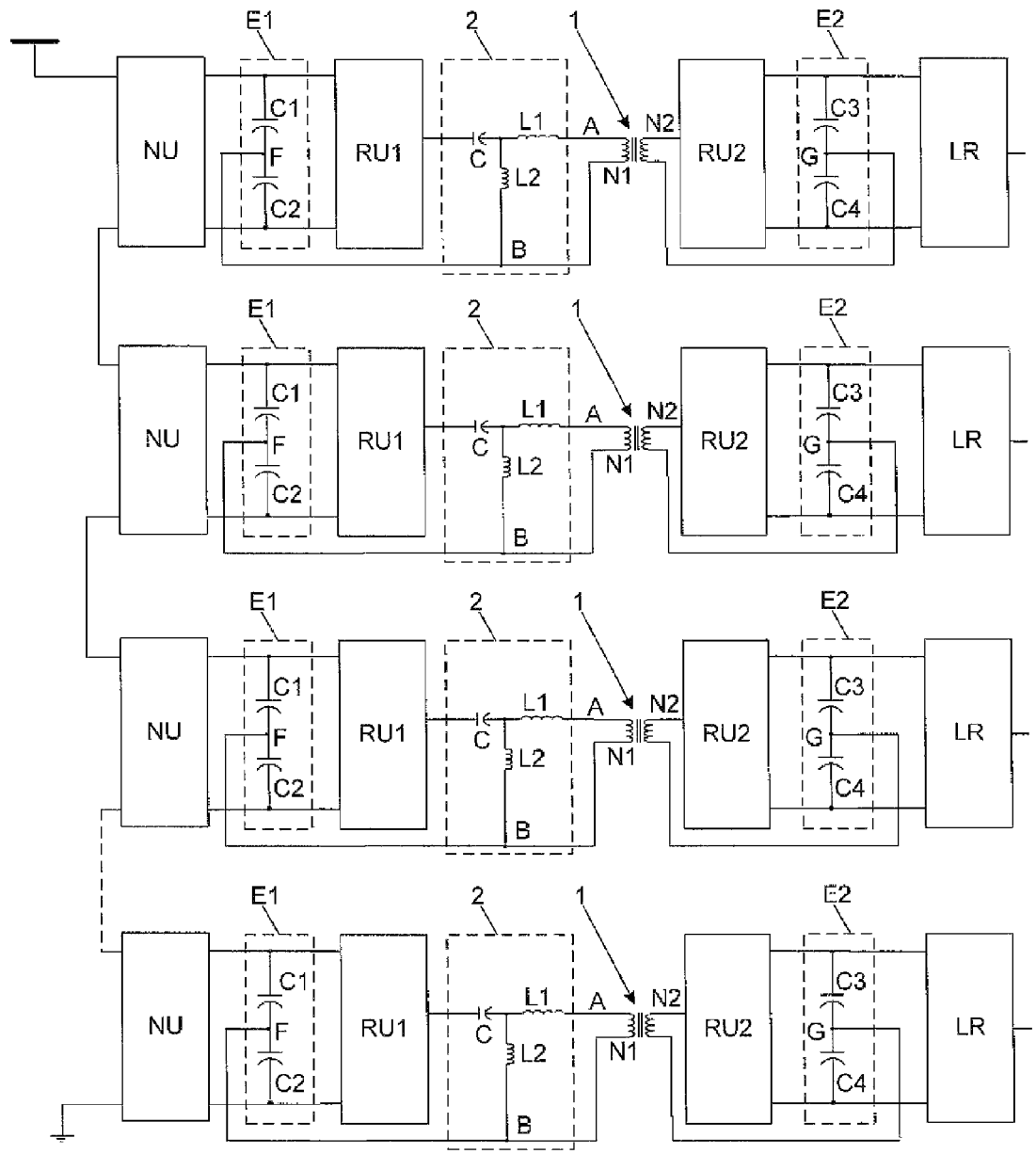
FIG. 3 shows a converter system with converter circuits in accordance with a first exemplary embodiment.

FIG. 3 shows a converter system with at least two converter circuits in accordance with a first exemplary embodiment. The converter system in FIG. 3 can have at least a first and a second converter circuit, each with mains converters NU connected on the input side. The mains converters NU in the converter system can be connected in series with one another on the input side. On the input side, the converter circuit therefore can allow a high input voltage, therefore allowing more electrical energy to be transmitted. Furthermore, it is also possible for the mains converters NU to be connected in parallel with one another on the input side, rather than being connected in series with one another on the input side. On the input side, this makes it possible for the converter system to process a large input current, and likewise to transmit more electrical energy.

Figure 4:
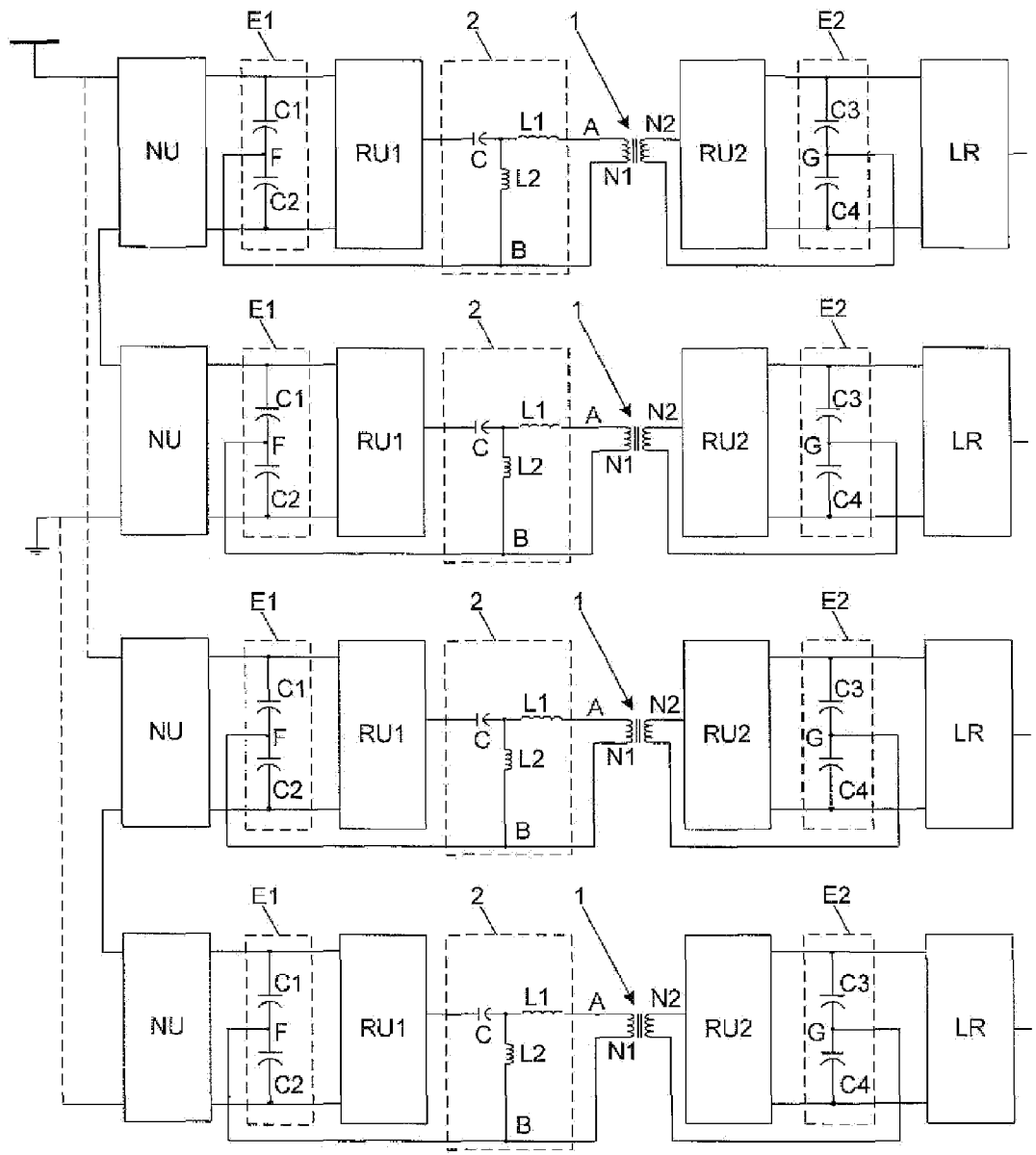
FIG. 4 shows a converter system with converter circuits in accordance with a second exemplary embodiment.

FIG. 4 shows a converter system with converter circuits in accordance with a second exemplary embodiment. In FIG. 4, a combination of converter circuits can be connected in series and in parallel on the input side with a mains converter NU can also be possible. As shown, two mains converters NU in the converter system, which can be connected in series with one another on the input side, could be connected in parallel on the input side with two further mains converters NU, which are themselves connected in series with one another.

Figure 5:
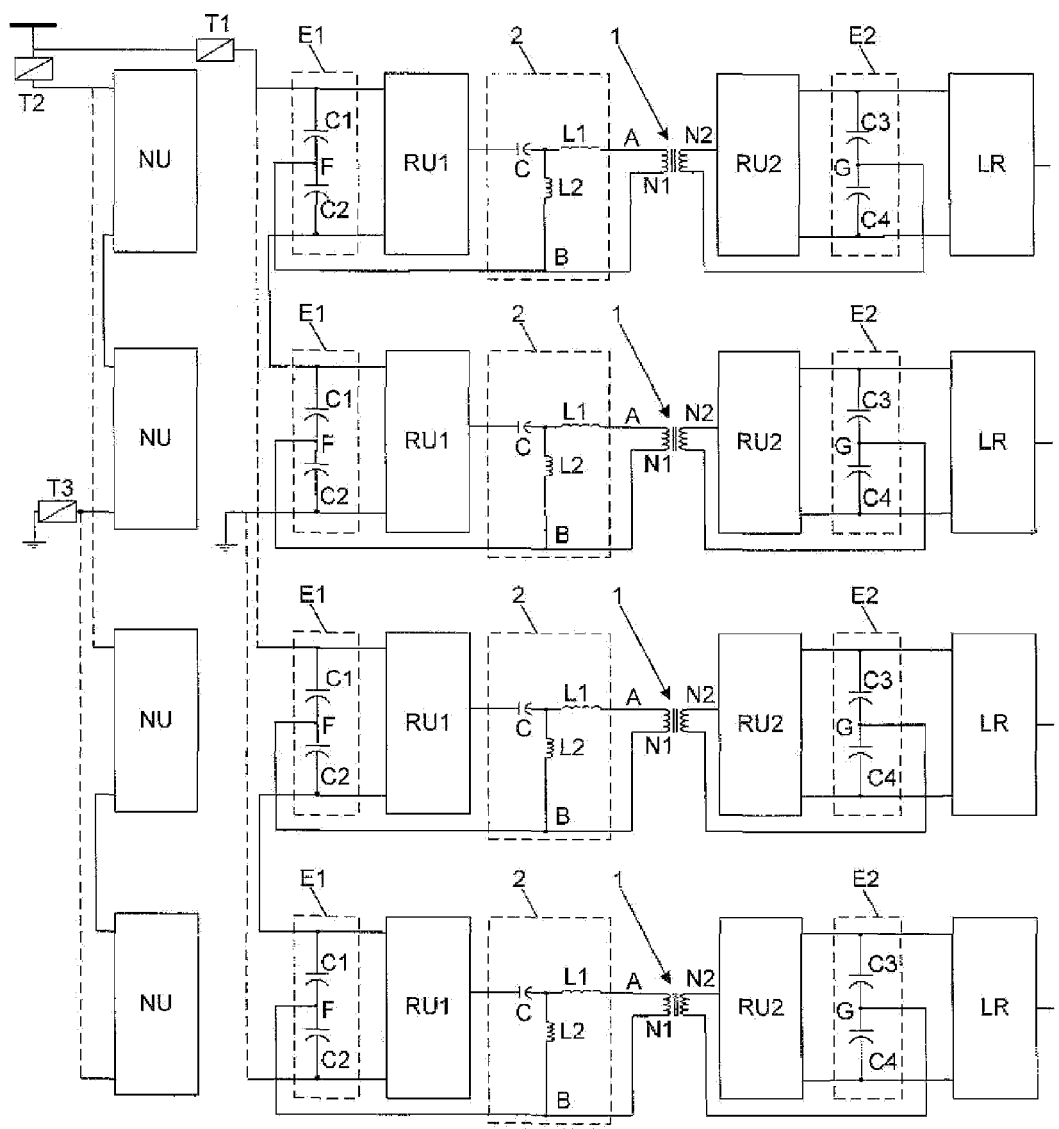
FIG. 5 shows a converter system with converter circuits in accordance with a third exemplary embodiment.

FIG. 5 shows a converter system with converter circuits in accordance with a third exemplary embodiment. FIG. 5 shows the converter system according to the disclosure as illustrated in FIG. 4, which has characteristics of converter circuits connected both in series and in parallel, in each case with mains converters NU connected on the input side, and additionally has switches T1, T2, T3. The mains converters NU in the converter system can be connected and disconnected via the switches T1, T2, T3 in a suitable manner. This can make it possible to switch between electrical power supply systems having AC and DC voltages. For example, operating the switches T1, T2, T3 can allow a change from an electrical power supply system which, for example, feeds an AC voltage of an alternating current into the mains converter NU in the converter system, to a different electrical power supply system which, for example, produces a direct current, or a DC voltage. The DC voltage or this direct current can be applied directly to the input side of the first energy storage circuits E1 by operation of the switches T1, T2, T3.

Figure 6:
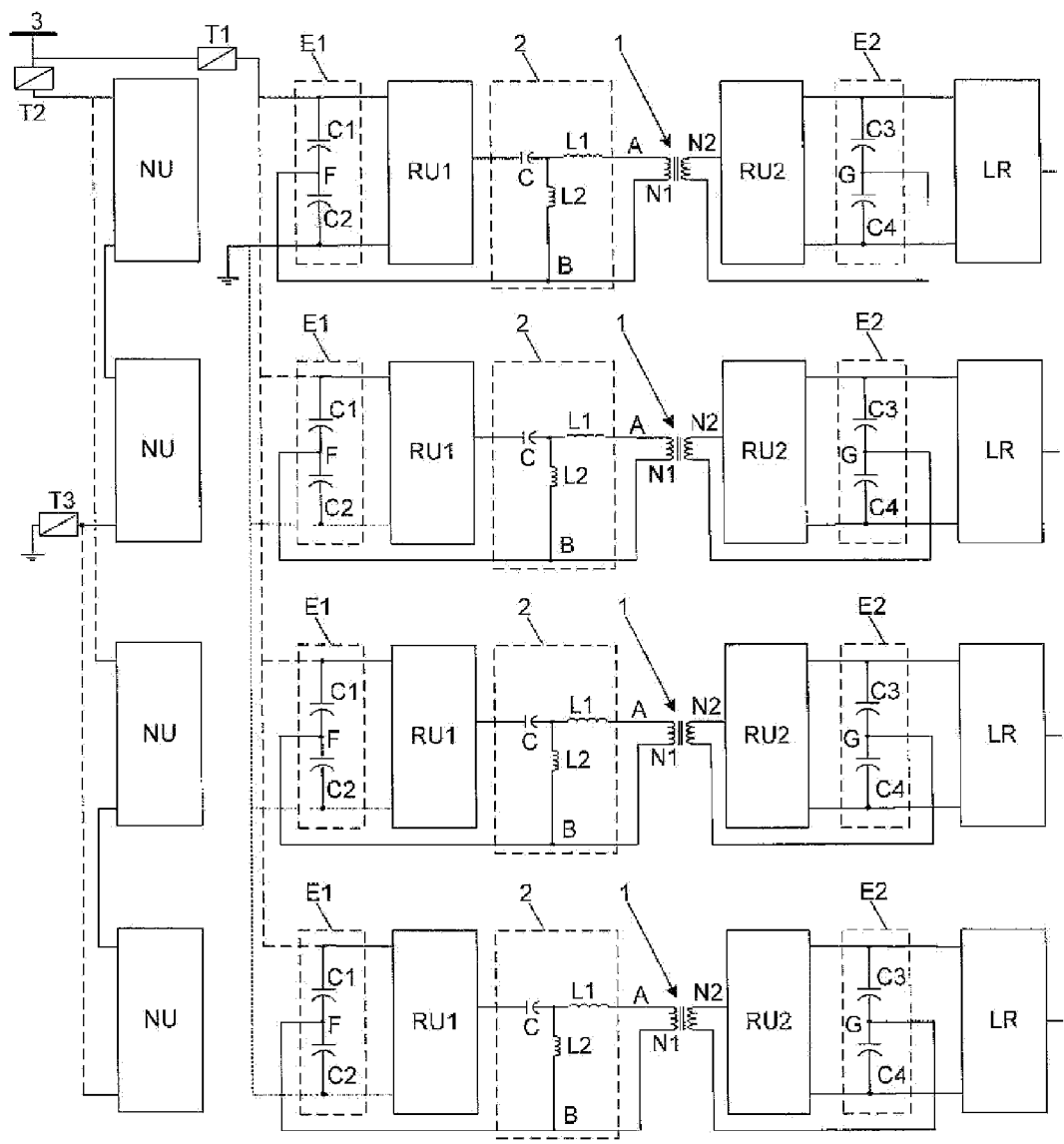
FIG. 6 shows a converter system with converter circuits in accordance with a fourth exemplary embodiment.

FIG. 6 shows a converter system with converter circuits in accordance with a fourth exemplary embodiment. FIG. 6 shows a similar converter system to that already illustrated in FIG. 5, with the difference that, with the switching of the four mains converters NU by operation of the switches T1, T2, T3, the electrical power supply system (3) can be switched directly from the mains converters NU to the input of the first energy storage circuits E1 in the converter system, in which case all four converter circuits are then connected in parallel with one another on the input side of the first energy storage circuits E1. The converter system illustrated in FIG. 6 can allow the processing of a large input DC voltage current which is applied to the first energy storage circuits E1.

Figure 7:
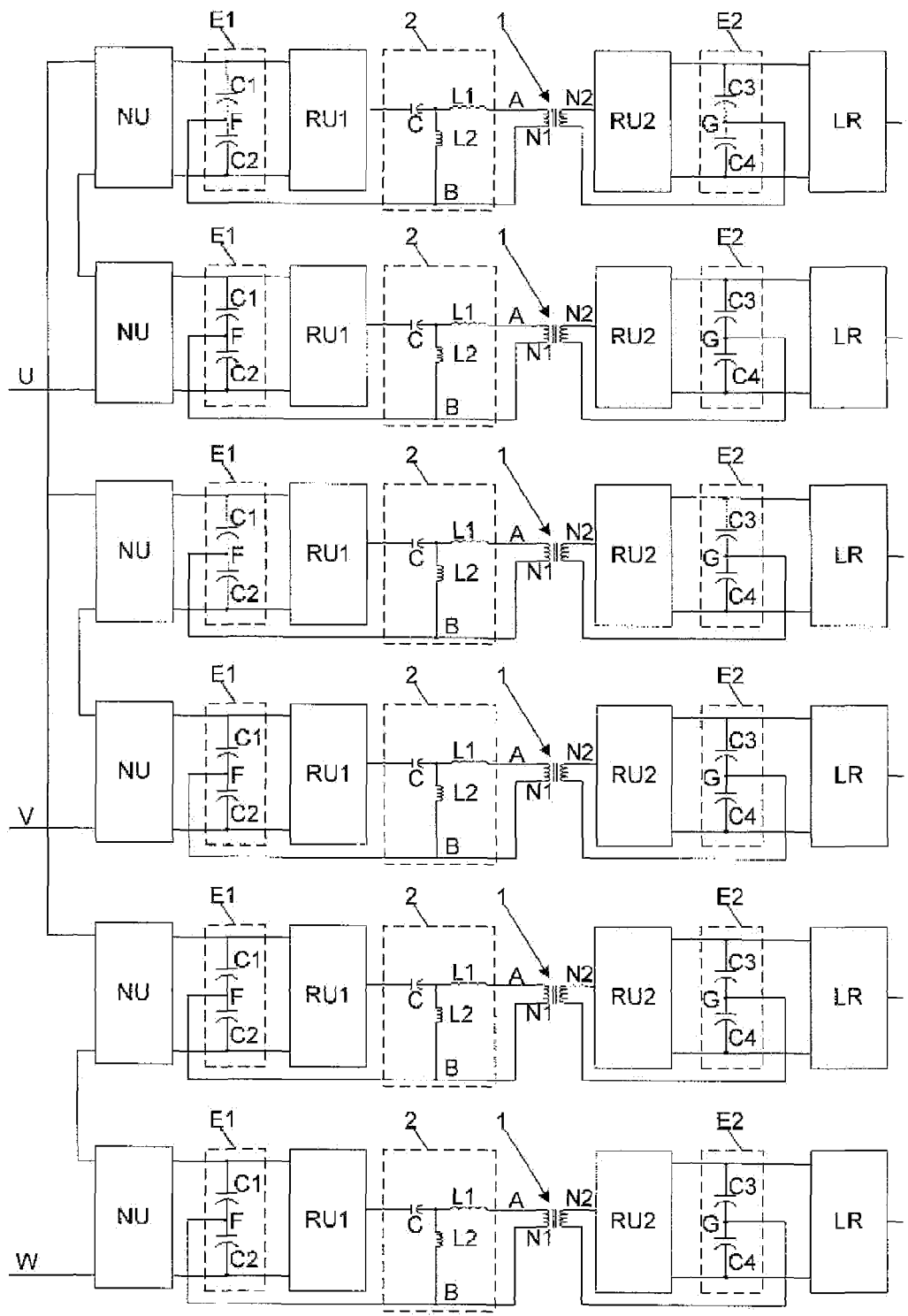
FIG. 7 shows a converter system with converter circuits in accordance with a fifth exemplary embodiment.

FIG. 7 shows a converter system with converter circuits in accordance with a fifth exemplary embodiment. FIG. 7 shows a converter system according to the invention, which is a three-phase system on the power supply system side in which two of the six illustrated converter circuits are each connected in series with associated mains converter NU, and can each be connected to one phase U, V, W of the electrical power supply system (3). This can allow the converter system to be connected to a three-phase power supply system, and the converter system allows high input voltages because the converter circuits are connected in series with one another.

Furthermore, both in the case of the exemplary converter unit according to the present disclosure and in the case of the converter system according to the invention, it can be possible for the load converters LR in the converter units of the converter systems to be connected in parallel or in series with one another on the output side. Connection of the load converters LR in parallel on the output side can allow a high output direct current. Connection of the load converters LR in series on the output side in turn allows a high output DC voltage.

The mains converters NU in the converter circuits, converter units and converter systems according to exemplary embodiments of the present disclosure can be in the form of AC/DC and/or DC/DC converters.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

A, B, F, G Connection point
C Resonant capacitance
C1, . . . C4 Capacitive energy store
E1, E2 Energy storage circuit
NU Mains converter
L1, L2 Resonant inductance
L3, L4 Inductance in the mains converter
LR Load converter
N1 Primary winding
N2 Secondary winding
RU1, RU2 Resonant converter
T1, . . . T4 Means for switching; switching means
S1, . . . S8 Power semiconductor switch 1 Transformer
2 CLL resonant circuit
3 Electrical power supply system

What is claimed is:

1. A converter circuit comprising:
a first resonant converter that is connected on a DC voltage side to a first energy storage circuit;
a transformer;
a second resonant converter that is connected on an AC voltage side to a secondary winding of the transformer and on the DC voltage side to a load converter; and
a CLL resonant circuit that is connected to the first resonant converter and to a primary winding of the transformer and has a resonant capacitance, a first resonant inductance, and a second resonant inductance,
wherein the resonant capacitance is connected in series with the first resonant inductance, which is connected to a first connection point of the primary winding of the transformer and the resonant capacitance is connected to the first resonant converter, and the second resonant inductance is connected to the connection point of the resonant capacitance to the first resonant inductance, the second resonant inductance is connected to a second connection point of the primary winding of the transformer, and the second connection point of the primary winding of the transformer is connected to the first resonant converter.

2. The converter circuit as claimed in claim 1, wherein the first energy storage circuit has a first capacitive energy store, and a second capacitive energy store, which is connected in series with the first capacitive energy store, and the second connection point of the primary winding of the transformer is connected to a connection point of the first energy storage circuit,
wherein the connection point is formed from the first energy store and the second energy store.

3. The converter circuit as claimed in claim 2, wherein the second resonant converter is connected on the DC voltage side to a second energy storage circuit, in that the second energy storage circuit has a third capacitive energy store, and a fourth capacitive energy store which is connected in series with the third capacitive energy store, and the secondary winding of the transformer is connected to a connection point of the second energy storage circuit, which connection point is formed from the third energy store and the fourth energy store.

4. The converter circuit as claimed in claim 3, wherein the second resonant inductance is integrated in the transformer.

5. The converter circuit as claimed in claim 4, wherein the first resonant inductance is integrated in the transformer.

6. The converter circuit as claimed in claim 1, wherein switching means is connected on the AC voltage side to an electrical power supply system, and is connected on the DC voltage side to the first energy storage circuit.

7. A converter circuit unit, wherein at least two converter circuits as claimed in claim 1, and
wherein the converter circuits are connected in series with one another on the input side.

8. A converter circuit unit, wherein at least two converter circuits as claimed in claim 1, wherein the converter circuits are connected in parallel with one another on the input side.

9. The converter circuit unit as claimed in claim 7, wherein at least a first converter circuit unit and at least a second converter circuit unit are provided, and wherein the converter circuit units are connected in parallel with one another.

10. A converter circuit system, wherein at least two converter circuits as claimed in claim 6 are provided,
wherein switching means are connected in series with one another on the input side.

11. The converter circuit system as claimed in claim 10, wherein at least a first converter circuit system and at least a second converter circuit system are provided, and the converter circuit systems are connected in parallel with one another.

12. The converter circuit system as claimed in claim 10, wherein a first, a second and a third converter circuit system are provided and are connected to one another, in order to be connected to a three-phase electrical power supply system.

* * * * *